Patented July 19, 1938

2,124,272

UNITED STATES PATENT OFFICE 2,124,272

PROCESS FOR PRODUCING SUBSTITUTED ACRYLIC ACID ESTERS

Carleton Ellis, Montclair, N. J., assignor to Ellis-Foster Company, a corporation of New Jersey No Drawing. Application January 9, 1937,
Serial No. 119,877

3 Claims. (Cl. 260—106)

This invention relates to the preparation of unsaturated esters, especially esters which have an unsaturation on the carbon alpha with respect to the carboxyl grouping. This type of structure is represented by the formula

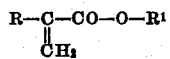

where R and $R^1$ may be either aliphatic or aromatic.

This invention also relates to the preparation of alpha-substituted esters, especially methyl substituted acrylic esters, where the "R" in the above formula represents methyl.

According to my invention, I treat a methyl ketone with ammonium cyanide (or with hydrogen cyanide followed by ammonia) which complex is then reacted with sulphuric acid (or other acid) and an alcohol for a suitable length of time to convert the cyano group of said complex to an esterified carboxylic group and the resulting mixture treated with a nitrite solution.

If in this process acetone is the starting material and methanol the alcohol used, then the resulting derivative will be the methyl ester of methyl acrylic acid. If ethanol is the alcohol used, the resulting product will be the ethyl ester of methyl acrylic acid.

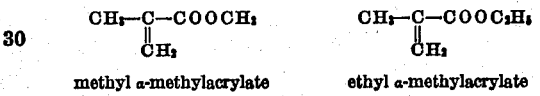

methyl α-methylacrylate    ethyl α-methylacrylate

Using other ketones rather than acetone will give rise to other homologous acrylic esters.

The method illustrative of carrying out my invention is as follows:

Ammonium chloride (53.5 parts) is mixed with sodium cyanide (50.5 parts) (or with potassium cyanide, 68.5 parts). The salts are then covered with 100 parts of water and stirred mechanically. The suspension of salts is cooled in a bath of ice water and acetone (58 parts) is slowly added, the solution again being stirred mechanically. After the acetone has been added the solution is allowed to rise to room temperature and the precipitated salts removed by filtration and washed with methanol, the washings being returned to the filtrate. Finally 50 grams of concentrated ammonium hydroxide are added to the solution.

A solution of methyl hydrogen sulphate is then prepared by adding sulphuric acid to methyl alcohol slowly with cooling and stirring. To the acetone cyanamine, 216 parts of methyl hydrogen sulphate is added and the solution heated for one to two weeks at 100° C. This time of heating could be shortened materially by heating to a higher temperature under pressure.

The resulting solution is then cooled to 0° C., the acidity adjusted to have approximately 1 mol. of acid by means of calcium carbonate, soda or dilute caustic, and treated with sodium nitrite solution made up from 77 parts of sodium nitrite dissolved in 200 parts of water.

After addition of the nitrite solution, the mass is brought up to room temperature and the oily layer floating on top of the aqueous solution is separated. The aqueous solution is then extracted with a low-boiling solvent (for example, petroleum ether), the solvent evaporated and the residue combined with the original oily fraction. The combined extracts are then washed with a dilute solution of urea dissolved in water, dried and fractionated. The fraction boiling from 98 to 103° C. is retained. During the fractionation care has to be exercised to exclude the action of air and oxidizing agents to prevent polymerization.

By carrying out the fractionation in a vacuum, the ester boils at a lower temperature and more adequate fractionation may be achieved without polymerization. For carrying out the fractionation in a vacuum, the boiling point of the monomeric methyl α-methylacrylate is as follows:

| Boiling point °C | Pressure mm. of mercury |
|---|---|
| 30 | 50 |
| 40 | 75 |
| 50 | 120 |
| 60 | 185 |
| 70 | 265 |
| 80 | 390 |
| 90 | 545 |
| 100 | 760 |

In the higher-boiling fractions a certain amount of the hydroxy ester could be isolated. When methanol is used, the methyl ester of alpha hydroxyisobutyrate can be obtained.

An alternative procedure for the preparation of acetone cyanamine was from acetone cyanohydrin as such. The acetone cyanohydrin is prepared by either reacting acetone with hydrogen cyanide in the presence of potassium carbonate or reacting acetone with sodium cyanide with dilute sulphuric acid in aqueous solution. The resulting cyanohydrin is dissolved in alcohol and the solution saturated with ammonia gas.

Moreover the diazotization may be carried out with other reagents than sodium nitrite, among which may be mentioned nitrogen trioxide gas, nitrosyl chloride, nitrosyl bromide and the like.

Depending on the kind of product obtained it may be used in a variety of ways, e. g., in resinous form for molding and coating purposes; in lacquers as a plasticizer and the like; with solid resins and so forth as a modifier of consistency; also for making laminated material, plywood and for various other adhesive purposes. In some cases the product may be employed for producing medical preparations and the like either with or without modifying agents or substituents such as iodine, quinine, and so forth.

What I claim is:

1. A process for the preparation of an ester of a substituted acrylic acid which comprises reacting a methyl ketonecyanamine with an alkyl sulphuric acid ester and deaminizating, by diazotization, the resulting product.

2. A process for the preparation of the methyl ester of methacrylic acid which comprises reacting acetonecyanamine with methyl hydrogen sulphate and deaminization of the resulting product by diazotization.

3. In the process for the preparation of an ester of a substituted acrylic acid, the steps which comprise reacting a methyl ketonecyanamine with a reagent capable of converting the cyano group of said compound to an esterified carboxylic group, and treating said product with a diazotizing agent resulting in deaminization.

CARLETON ELLIS.